United States Patent
Malina et al.

(10) Patent No.: US 10,089,023 B2
(45) Date of Patent: Oct. 2, 2018

(54) DATA MANAGEMENT FOR OBJECT BASED STORAGE

(71) Applicant: Western Digital Technologies, Inc., Irvine, CA (US)

(72) Inventors: James N. Malina, Irvine, CA (US); Benixon Arul Dhas, Irvine, CA (US); Mohamad Hasmizal Azmi, Bukit Beruntung (MY); Austin Liou, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 199 days.

(21) Appl. No.: 14/747,098

(22) Filed: Jun. 23, 2015

(65) Prior Publication Data

US 2016/0378364 A1 Dec. 29, 2016

(51) Int. Cl.
G06F 12/00 (2006.01)
G06F 13/00 (2006.01)
G06F 13/28 (2006.01)
G06F 3/06 (2006.01)

(52) U.S. Cl.
CPC .......... G06F 3/0619 (2013.01); G06F 3/0665 (2013.01); G06F 3/0667 (2013.01); G06F 3/0689 (2013.01); G06F 3/0614 (2013.01); G06F 3/0616 (2013.01); G06F 3/0617 (2013.01); G06F 3/0683 (2013.01)

(58) Field of Classification Search
CPC .... G06F 3/0619; G06F 3/0616; G06F 3/0617; G06F 3/0614; G06F 3/0665; G06F 3/0667; G06F 3/0689; G06F 3/0683

USPC .................................................. 711/114, 112
See application file for complete search history.

(56) References Cited

U.S. PATENT DOCUMENTS

| | | | |
|---|---|---|---|
| 7,752,491 | B1 | 7/2010 | Liikanen et al. |
| 8,736,993 | B2 | 5/2014 | Bandic et al. |
| 8,953,269 | B1 | 2/2015 | Hamilton et al. |
| 9,002,795 | B2 | 4/2015 | Messinger et al. |
| 2005/0015546 | A1* | 1/2005 | Zohar .................. G06F 3/0607 711/114 |
| 2005/0216657 | A1* | 9/2005 | Forrer, Jr. ........... G06F 11/2084 711/112 |
| 2006/0288156 | A1 | 12/2006 | Fish et al. |
| 2007/0025005 | A1 | 2/2007 | Shimizu |
| 2007/0185902 | A1* | 8/2007 | Messinger ............ G06F 3/0619 |
| 2012/0233418 | A1* | 9/2012 | Barton .............. G06F 17/30575 711/162 |

(Continued)

OTHER PUBLICATIONS

Ceph, "Adding/Removing OSDS," Ceph Documentation, http://ceph.com/docs/master/rados/operations/add-or-rm-osds/, downloaded on Oct. 8, 2015, pp. 1-8.

(Continued)

*Primary Examiner* — Shane Woolwine
(74) *Attorney, Agent, or Firm* — Barry IP Law

(57) ABSTRACT

An object based storage cluster includes at least one Data Storage Device (DSD) with a plurality of media portions for storing data. Media mapping information is received from the at least one DSD with the media mapping information indicating addresses assigned to each media portion of the plurality of media portions. Each media portion of the plurality of media portions is identified as a separate Object Storage Device (OSD) in the object based storage cluster using the media mapping information.

36 Claims, 10 Drawing Sheets

(56) References Cited

U.S. PATENT DOCUMENTS

| | | |
|---|---|---|
| 2013/0205114 A1 | 8/2013 | Badam et al. |
| 2015/0052167 A1 | 2/2015 | Olster et al. |
| 2015/0089317 A1* | 3/2015 | Patapoutian ........ H03M 13/353 714/755 |
| 2015/0268885 A1* | 9/2015 | Reddin ............... G06F 9/45558 711/114 |

OTHER PUBLICATIONS

International Search Report and Written Opinion dated Aug. 24, 2016 from counterpart International Application No. PCT/US2016/037396, 15 pages.

* cited by examiner

DATA MANAGEMENT FOR OBJECT BASED STORAGE

BACKGROUND

The growth of distributed computing, mobile applications, social media applications, and big data applications (i.e., the collection of large amounts of data or complex data) has led to an increase in object based storage which generally allows for better scalability than file based storage. In many cases, the data objects may never be accessed again, but they are expected to remain accessible if needed. Examples of such data objects can include photos, movies, e-commerce data, or archival data stored across a network as in cloud storage.

In addition, these applications have led to the need for larger storage capacities to retain data. In response, data is often stored in a cluster or group of Data Storage Devices (DSDs) that each includes its own storage media such as rotating magnetic disks or solid-state memories such as flash. In an object based cluster of DSDs such as in Ceph, Hadoop, Swarm, or OpenStack clusters, each DSD is generally treated as a separate Object Storage Device (OSD) that is either available or unavailable for storing data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
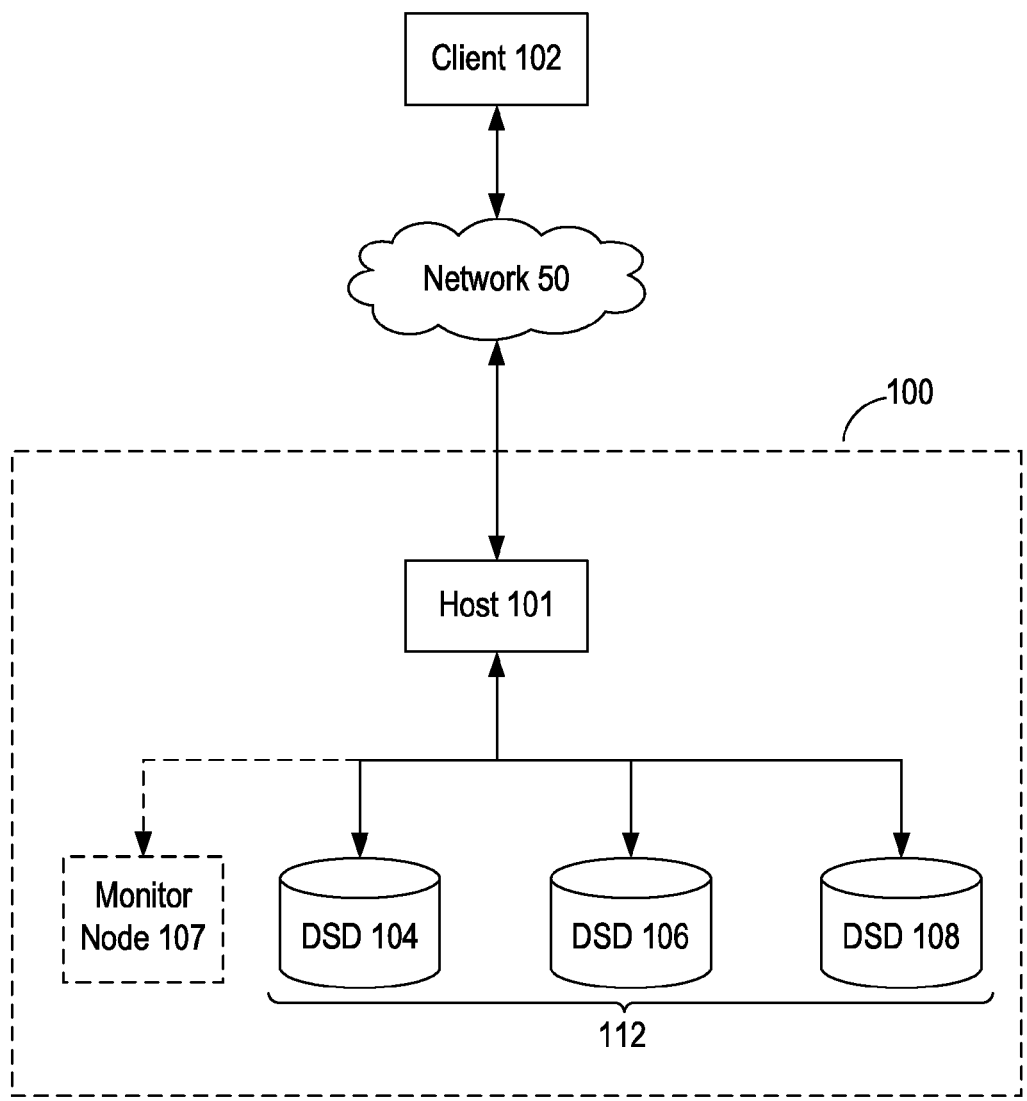
FIG. 1 is a block diagram depicting a data storage system according to an embodiment.

FIG. 1 is a block diagram depicting data storage system 100, which is accessed by client 102 via network 50 according to an embodiment. As shown in FIG. 1, data storage system 100 includes host 101 which communicates with object based storage cluster 112 to store and retrieve data from DSDs 104, 106, and 108 in cluster 112. Client 102 may use system 100 for storing data remotely such as for a mobile or social media application executed by client 102 or for a distributed computing or big data application executed by client 102. In this regard, network 50 may include a local area network, a wide area network, or the Internet.

In addition, system 100 may optionally include one or more monitor nodes such as monitor node 107 that can include a controller or processor to monitor the status of DSDs 104, 106, and 108 in cluster 112. Monitor node 107 may also initiate a rebalancing of data stored in DSDs 104, 106, and 108. In other embodiments, such monitoring and rebalancing functions may be performed by host 101 or by a controller of one of DSDs 104, 106, and 108, which may act as a monitor node.

Those of ordinary skill in the art will appreciate that other implementations can include more or less than those elements shown in FIG. 1 and that the disclosed processes can be implemented in other environments. For example, other implementations can include a different number of clients, hosts, or DSDs. In one such implementation, each of DSDs 104, 106, and 108 can include their own host instead of sharing host 101 as in the example of FIG. 1.

As discussed in more detail below, host 101 executes an object storage platform (e.g., object storage platform 18 in FIG. 2) such as Ceph, Hadoop, Swarm, or OpenStack to store data objects such as photos, movies, e-commerce data, or archival data across cluster 112.

Figure 2:
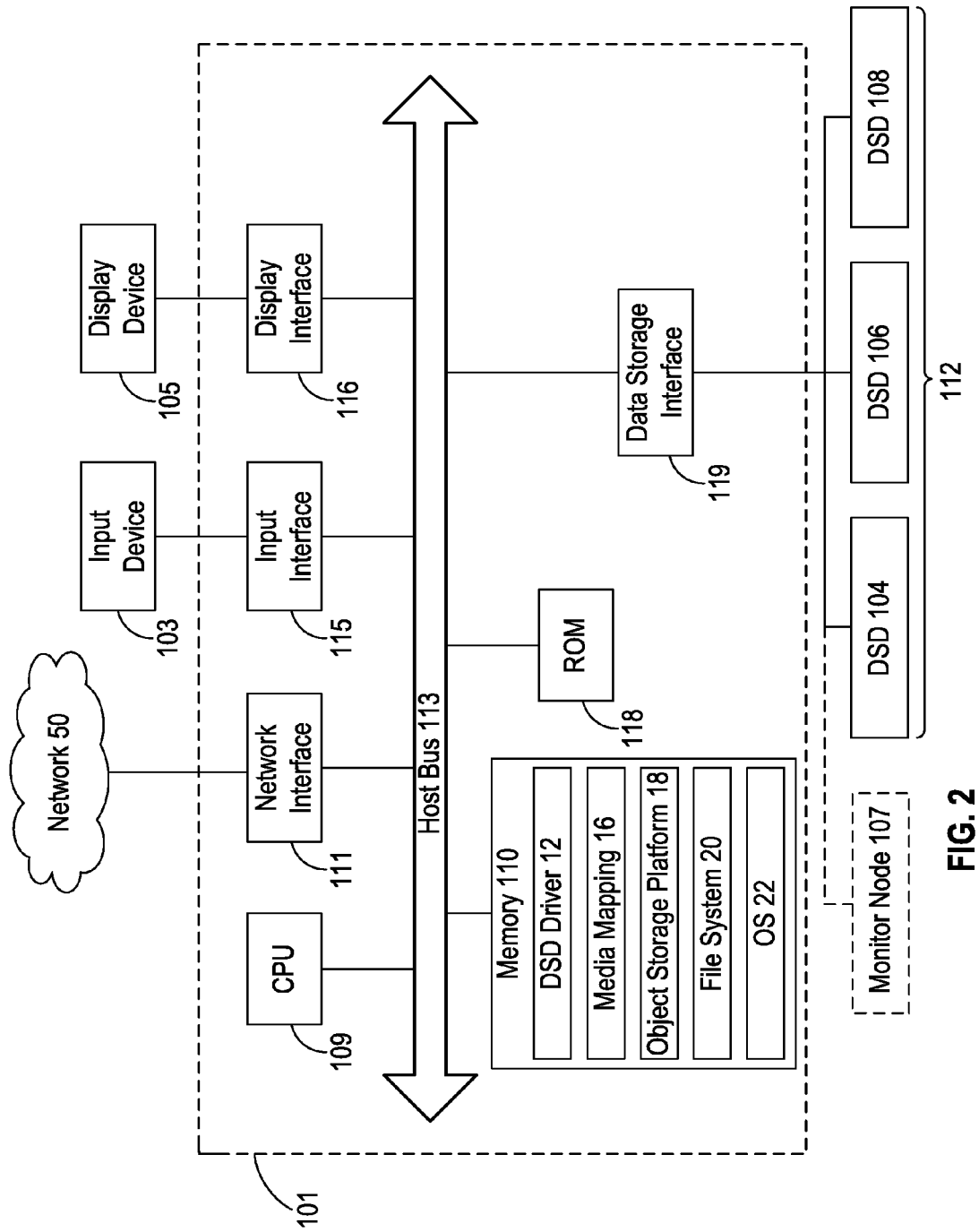
FIG. 2 is a block diagram of a host in the data storage system of FIG. 1 according to an embodiment.

FIG. 2 is an example block diagram for host 101 according to an embodiment. In the example of FIG. 2, host 101 includes Central Processing Unit (CPU) 109 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. A processor of host 101 as referenced hereinafter can be one or more of the foregoing processors or another processor configured to perform functions described herein.

CPU 109 interfaces with host bus 113. Also interfacing with host bus 113 are memory 110, input interface 115 for input device 103, display interface 116 for display device 105, Read Only Memory (ROM) 118, network interface 111 for network 50, and data storage interface 119 for DSDs 104, 106, and 108.

Input device 103 can be a keyboard, scroll wheel, or pointing device allowing a user of host 101 to enter information and commands to host 101, or to allow a user to manipulate objects displayed on display device 105. In other embodiments, input device 103 and display device 105 can be combined into a single component, such as a touch-screen that displays objects and receives user input.

Memory 110 may include a computer readable medium of various types of volatile or non-volatile Random Access Memory (RAM) that interface with host bus 113 to provide information stored in memory 110 to CPU 109 during execution of instructions in software programs such as DSD driver 12, object storage platform 18, file system 20, or Operating System (OS) 22. Data such as media mapping information 16 or data to be stored in or retrieved from cluster 112 can also be stored in memory 110 so that the data can be accessed by CPU 109 during execution of software programs to the extent that such software programs have a need to access and/or modify the data.

As shown in FIG. 2, memory 110 can be configured to store DSD driver 12 and media mapping information 16. DSD driver 12 provides a software interface for DSDs 104, 106, and 108 on host 101. In some implementations, DSD driver 12 may also include a health monitoring module for monitoring an indicator of reliability for storing data on disk surfaces of DSDs 104, 106, and 108.

Media mapping information 16 can indicate addresses such as Logical Block Addresses (LBAs) that are assigned to different media portions (e.g., disk surfaces 134, 136, 138 and 142 in FIG. 3A or dies 334 to N in FIG. 3B) of DSDs 104, 106 and 108 for storing data associated with the addresses. As described in more detail below with reference to FIG. 3, a media portion of a DSD can be associated with a contiguous range of addresses that can be identified as a separate Object Storage Device (OSD) by object storage platform 18.

Object storage platform 18 can include software for distributing data objects among OSDs within cluster 112. In this regard, object storage platform 18 can include, for example, software platforms such as Ceph, Hadoop, Swarm, or OpenStack.

File system 20 can be optionally used to access or organize files stored in cluster 112. In one example, file system 20 can include a file system that may be well suited to sequentially writing data for zones on disk surfaces in cluster 112 that are written using Shingled Magnetic Recording (SMR). With SMR, tracks are written on a disk surface so that the tracks overlap to increase the storage capacity of the disk surface. Examples of file systems that may be well suited to SMR can include Linear Tape File System (LTFS) or a log-structured file system like New Implementation of a Log-structured File System (NILFS). Other file systems 20 can include, for example, B-tree file system (Btrfs), ext2, ext3, ext4, or XFS. File system 20 can operate in a kernel space of OS 22.

In some implementations, file system 20 can include a file system such as ZFS that can aggregate logical volumes of data stored in cluster 112. Such a file system may be used to present the data stored on different disk surfaces as different logical volumes that can be identified as separate OSDs by object storage platform 18.

OS 22 manages hardware and software resources of system 100 and can include, for example, a Linux OS, Android OS, Windows OS, Mac OS, or a customized OS. Hardware resources managed by OS 22 can include, for example, network interface 111, memory 110, CPU 109, and DSDs 104, 106 and 108. Software resources managed by OS 22 can include, for example, file system 20, object storage platform 18, or DSD driver 12.

Data storage interface 119 is configured to interface host 101 with DSDs 104, 106 and 108, and can interface according to a standard such as, for example, Serial Advanced Technology Attachment (SATA), PCI express (PCIe), Small Computer System Interface (SCSI), or Serial Attached SCSI (SAS).

Figure 3A:
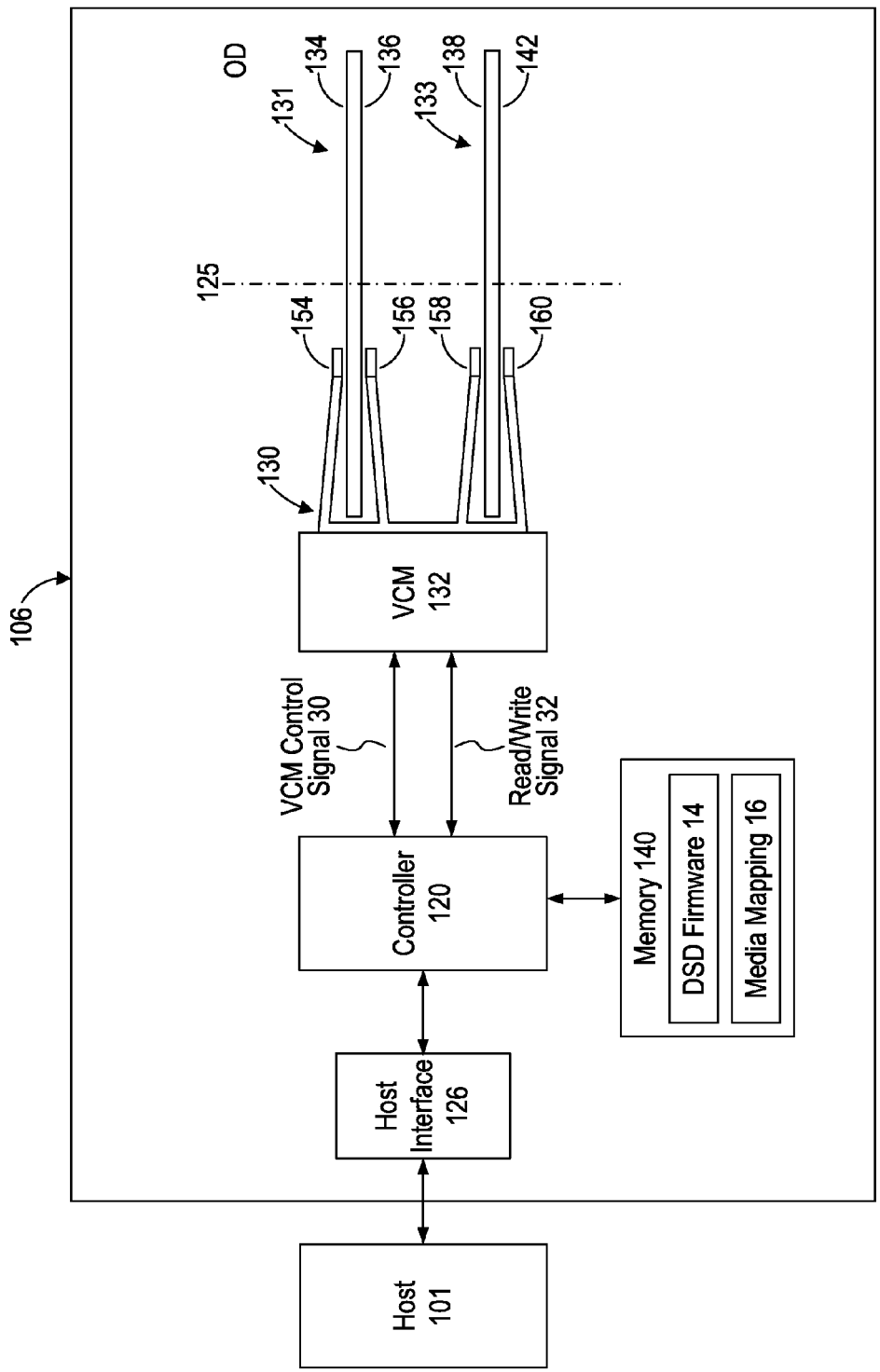
FIG. 3A is a block diagram of a Data Storage Device (DSD) in the data storage system of FIG. 1 that includes disk surfaces as media portions according to an embodiment.

FIG. 3A is an example block diagram of DSD 106 in cluster 112 according to an embodiment where media portions for storing data in DSD 106 includes disk surfaces. As shown in the example of FIG. 3A, DSD 106 includes Non-Volatile Memory (NVM) in the form of rotating magnetic disks 131 and 133. In other embodiments, DSD 106 may include a different number of disks or a different type of NVM such as a solid-state memory in addition to rotating magnetic disks.

DSD 106 includes controller 120 which includes circuitry such as one or more processors for executing instructions including a microcontroller, DSP, ASIC, FPGA, hard-wired logic, analog circuitry and/or a combination thereof. In one implementation, controller 120 can include a System on a Chip (SoC).

Host interface 126 is configured to interface DSD 106 with host 101 and may interface according to a standard such as, for example, SATA, PCIe, SCSI, or SAS. As will be appreciated by those of ordinary skill in the art, host interface 126 can be included as part of controller 120. Although FIGS. 1 to 3A depict the co-location of host 101 and the DSDs of cluster 112, in other embodiments the two need not be physically co-located. In such embodiments, one or more of the DSDs of cluster 112 may be located remotely from host 101 and connected to host 101 via a network interface. For example, one or more of DSDs 104, 106, and 108 can be located in a different room, building, or city than host 101.

In the example of FIG. 3A, disks 131 and 133 form a disk pack that is rotated by a spindle motor (not shown) about axis 125. Heads 154, 156, 158, and 160 are positioned to read and write data on a corresponding disk surface of disks 131 or 133. Each of disk surfaces 134, 136, 138, and 142 includes a number of radially spaced, concentric tracks for storing data that are arranged in one or more zones of tracks, which is discussed in more detail below with reference to FIG. 4.

Heads 154, 156, 158, and 160 are connected to the distal end of actuator 130 which is rotated by Voice Coil Motor (VCM) 132 to position heads 154, 156, 158, and 160 over tracks on disk surfaces 134, 136, 138, and 142, respectively. Controller 120 can include servo control circuitry (not shown) to control the rotation of disks 131 and 133, and to control the position of the heads using VCM control signal 30.

Memory 140 of DSD 106 is configured to store DSD firmware 14 and media mapping information 16. In some implementations, memory 140 can be a volatile memory such as Dynamic Random Access Memory (DRAM) with copies of DSD firmware 14 and media mapping information 16 stored in an NVM such as on disks 131 or 133, or in another NVM of DSD 106.

DSD firmware 14 includes computer executable instructions for execution by controller 120 in operating DSD 106. Each of the DSDs in cluster 112 can include their own DSD firmware 14 for controlling operation of the DSD.

Media mapping information 16 indicates addresses such as LBAs that are assigned to each of disk surfaces 134, 136, 138, and 142. The addresses can form a contiguous range for the disk surface that is identified by object storage platform 18 as an OSD. Although each DSD in cluster 112 may have the same number of disk surfaces, the addresses assigned to disk surfaces in different DSDs will differ. Media mapping information 16 therefore allows host 101 to identify each disk surface in cluster 112 as a separate OSD. By identifying each disk surface as a separate OSD, it is ordinarily possible to better handle a failure of a particular head or disk surface in cluster 112 than in a conventional object based cluster where an entire DSD may need to be rebuilt due to the failure of a single head or disk surface.

For example, if head 154 were to fail, only the data stored on disk surface 134 would need to be reconstructed rather than reconstructing the data stored on each disk surface of DSD 106. The reconstruction of the data can be performed using parity data or copies of the data that are stored on another OSD in cluster 112. Identifying each disk surface as a different OSD, allows for a longer use of a DSD that may have a failed head or disk surface since other disk surfaces in the DSD can continue to be used. In addition, the rebuild process for a single disk surface is faster than for an entire DSD and uses less system resources such as network bandwidth, power, memory, and processing since there is less data to transfer.

In addition, with each disk surface identified as a separate OSD by host 101, the DSDs in cluster 112 ordinarily do not have to move or redirect data stored within the DSD in the event of the failure of a head or disk surface. Instead, this redirection or migration can be handled by host 101, which typically has greater resources than the DSD in terms of processing.

In operation, host interface 126 receives host read and write commands from host 101 via host interface 126 for reading data from and writing data to disks 131 and 133. In response to a write command from host 101, controller 120 may buffer the data to be written for the write commands in memory 140.

For data to be written on a disk surface, a read/write channel (not shown) of controller 120 may encode the buffered data into write signal 32 which is provided to a head for magnetically writing data on a disk surface that has been assigned the LBAs for the data in the write command. In addition, controller 120 via a servo system (not shown) can provide VCM control signal 30 to VCM 132 to position the head over a particular track for writing the data.

In response to a read command for data stored on disk 131 or 133, controller 120 via a servo system positions a head over a particular track on a disk surface that has been assigned the LBAs for the data in the read command. Controller 120 controls the head to magnetically read data stored in the track and to send the read data as read signal 32. A read/write channel of controller 120 can then decode and buffer the data into memory 140 for transmission to host 101 via host interface 126.

Figure 3B:
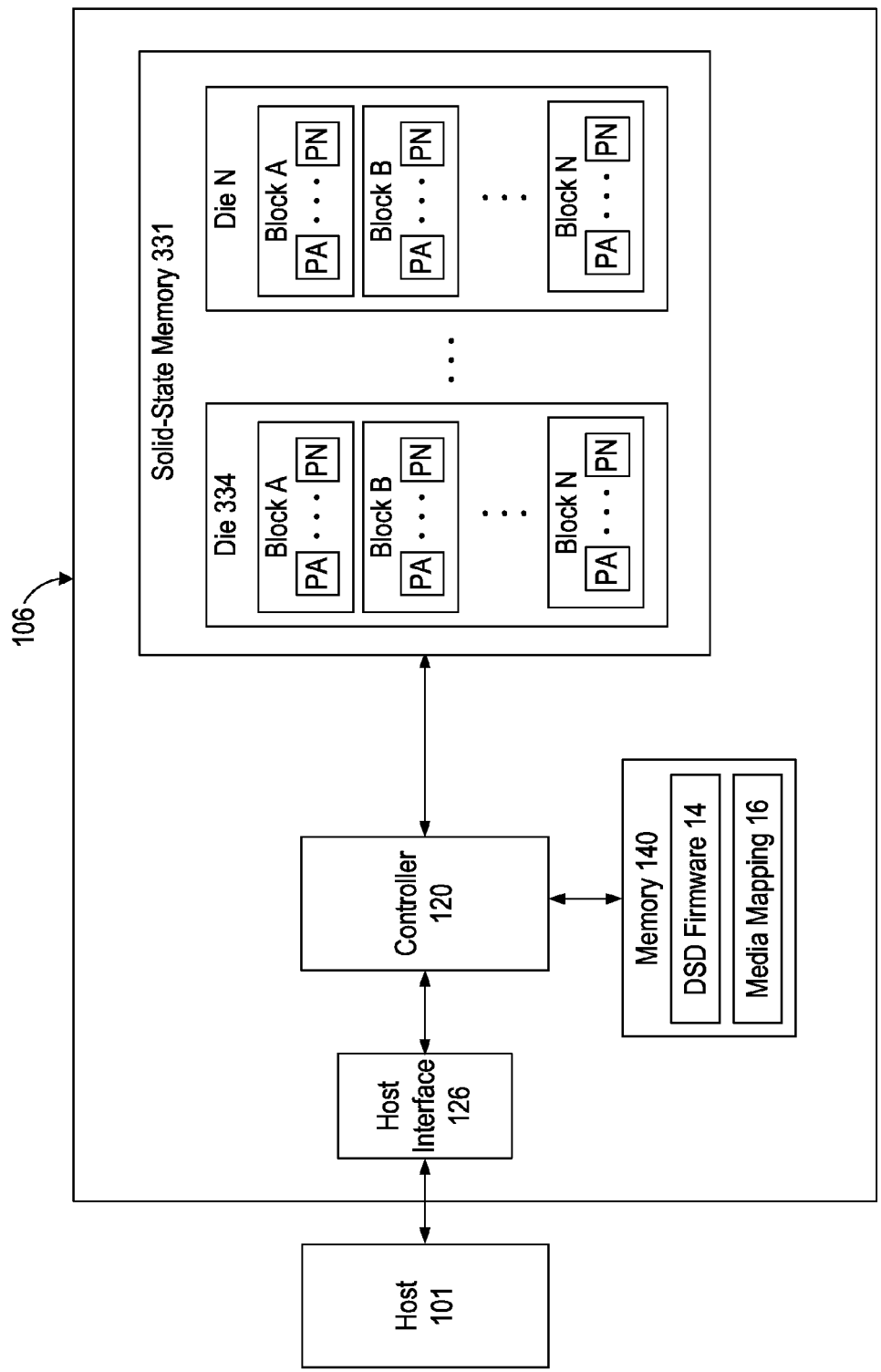
FIG. 3B is another embodiment of a DSD in the data storage system of FIG. 1 that includes dies of a solid-state memory as media portions.

FIG. 3B provides a different example embodiment of DSD 106 where the media portions for storing data in DSD 106 include dies 334 to N of solid-state memory 331 rather than disk surfaces of rotating magnetic disks. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 3B, the NVM of disks 131 and 133 in FIG. 3A have been replaced by solid-state memory 331 which is used as a NVM for storing data in the embodiment of FIG. 3B. In addition, the media portions of disk surfaces 134, 136, 138, and 142 in FIG. 3A have been replaced by media portions of die 334 to die N (e.g., NAND dies) in FIG. 3B. While a single solid-state memory 331 is shown in FIG. 3B for convenience, DSD 106 may include multiple solid-state memories such as solid-state memory 331. Each die of solid-state memory 331 includes blocks A to N, which in turn, includes pages PA to PN. In the example of FIG. 3B, the pages are the smallest grouping of memory cells (not shown) that can be programmed in a single operation or as a unit.

For data to be stored in solid-state memory 331, controller 120 receives data from host interface 126 and may buffer the data in memory 140. In one implementation, the data is then encoded into charge values for charging cells of pages to store the data.

In response to a read command for data stored in solid-state memory 331, controller 120 in one implementation reads current values for cells of pages and decodes the current values into data that can be transferred to host 101 via host interface 126.

In the example of FIG. 3B, media mapping 16 indicates addresses such as LBAs that are assigned to each of die 334 to die N. The addresses can form a contiguous range for each die that is identified by object storage platform 18 as an OSD. Although each DSD in cluster 112 may have the same number of dies, the addresses assigned to dies in different DSDs will differ. Media mapping information 16 therefore allows host 101 to identify each die in cluster 112 as a separate OSD. By identifying each die as a separate OSD, it is ordinarily possible to better handle a failure of a particular die in cluster 112 than in a conventional object based cluster where an entire DSD may need to be rebuilt due to the failure of a single die.

For example, if die 334 were to fail, only the data stored in die 334 would need to be reconstructed rather than reconstructing the data stored in each die of solid-state memory 331. The reconstruction of the data can be performed using parity data or copies of the data that are stored on another OSD in cluster 112. Identifying each die as a different OSD, allows for a longer use of a DSD that may have a failed die since other dies in the DSD can continue to be used. In addition, the rebuild process for a single die is faster than for an entire DSD and uses less system resources such as network bandwidth, power, memory, and processing since there is less data to transfer.

In addition, with each die identified as a separate OSD by host 101, the DSDs in cluster 112 ordinarily do not have to move or redirect data stored within the DSD in the event of the failure of a die. Instead, this redirection or migration can be handled by host 101, which typically has greater resources than the DSD in terms of processing.

In view of the above descriptions of FIGS. 3A and 3B, one or more dies can be analogous to a disk surface and one or more blocks within the dies can be analogous to a zone of tracks on a disk surface. For the sake of brevity, the remainder of the disclosure will primarily use examples where a media portion is a disk surface with zones to illustrate the various embodiments. However, the example embodiments discussed below can similarly be implemented using dies of a solid-state memory as media portions and with blocks of solid-state memory acting as zones.

In other embodiments, a media portion can comprise less than a full die or less than a full disk surface. In the case of a solid-state memory, a media portion identified as a separate OSD can be a group of pages or blocks within a die or one or more zones of tracks on a disk surface. In yet other embodiments, a media portion identified as a separate OSD can be greater than a single die or a single disk surface, such as a group of dies in a channel of a solid-state memory or two disk surfaces of a particular disk.

Figure 4:
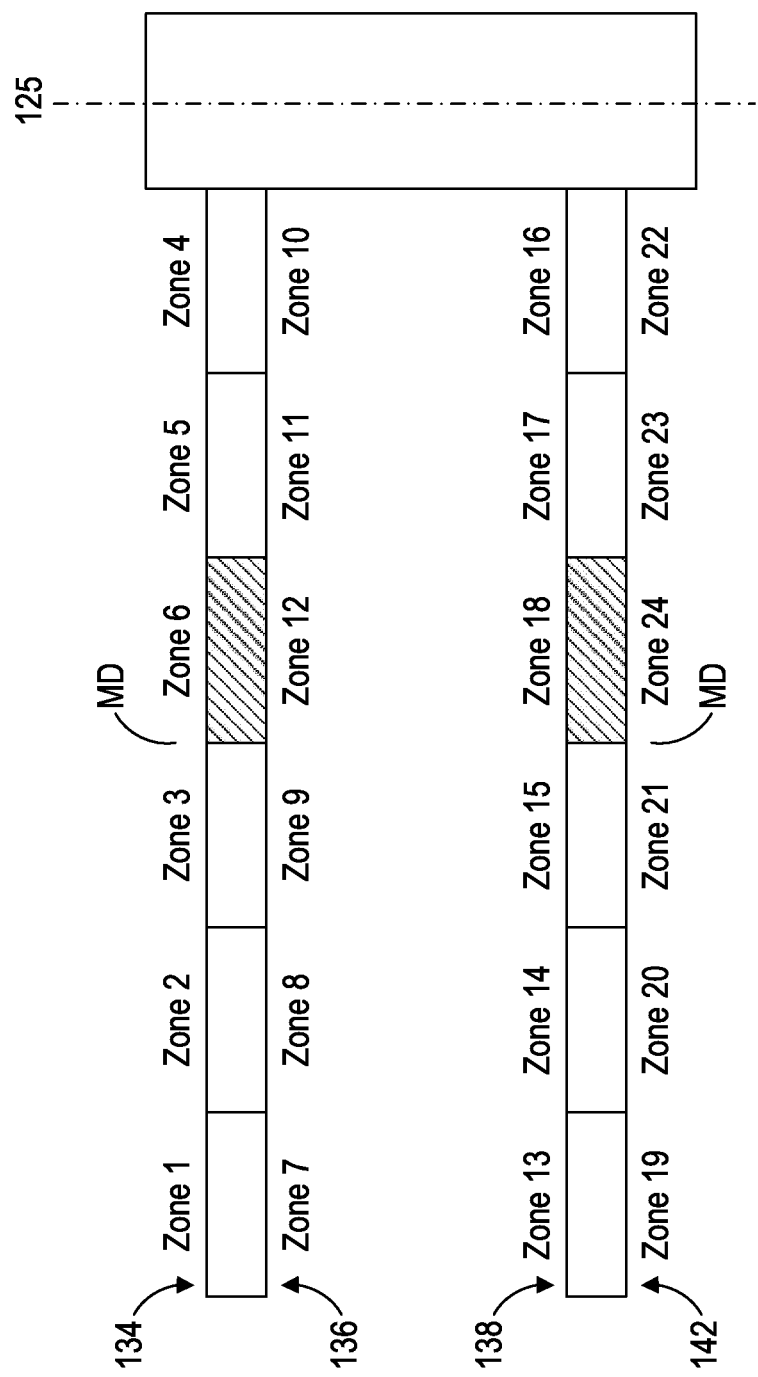
FIG. 4 depicts an example zone configuration for multiple disk surfaces according to an embodiment.

FIG. 4 depicts an example zone configuration for disk surfaces 134, 136, 138, and 142 of FIG. 3A according to an embodiment. In this regard, DSD 106 can be formatted as a zone block device such that the addresses for data (e.g., LBAs) stored on each disk surface form a contiguous or consecutive range of addresses with each zone on the disk surface forming a contiguous or consecutive subset of addresses within the address range of the disk surface.

In one implementation, zones 1 to 24 are Zone ATA Command (ZAC) zones having the same number of addresses assigned to each zone. Although the example of FIG. 4 shows each disk surface as having the same number of zones, other implementations may use different numbers of zones for different disk surfaces. In addition, the ordering of zones across a disk surface may differ from the butterfly arrangement shown in FIG. 4 where the zones increment toward a Middle Diameter (MD) location of the disk surface from both an Inner Diameter (ID) location and an Outer Diameter (OD) location. For example, other embodiments may have zones incrementing from the OD location across the disk surface toward the ID location.

In FIG. 4, the addresses of zone 1 are contiguous to the addresses of zone 2, which are contiguous to the addresses of zone 3, which in turn are contiguous to the addresses of zone 4, and so on. In other words, each disk surface is assigned a contiguous range of addresses. For example, disk surface 134 may include an address range of LBAs from 0 to 6,000 with zone 1 having addresses 0 to 1,000 and zone 2 having addresses 1,001 to 2,000.

As shown in FIG. 4, shaded zones 6, 12, 18, and 24 near the MD location of each disk surface provide a zone that can be used for storing metadata or other data that is more randomly written than the data stored in the non-shaded zones. Other implementations may not include such random write zones on one or more of disk surfaces 134, 136, 138, or 142, or may instead store such data in another NVM of DSD 106 such as a solid-solid state memory. In an implementation where the non-shaded zones are written with overlapping tracks using SMR, shaded zones 6, 12, 18, and 24 may include non-overlapping tracks to better allow for the rewriting of data in these zones. In more detail, the rewriting of data in overlapping SMR tracks is often limited since such rewrites can affect the data in an adjacent track.

As discussed below with reference to FIG. 5, the layout of each disk surface including zones forming a contiguous range of addresses allows host 101 to identify each disk surface as a separate OSD in an object based cluster.

Figure 5:
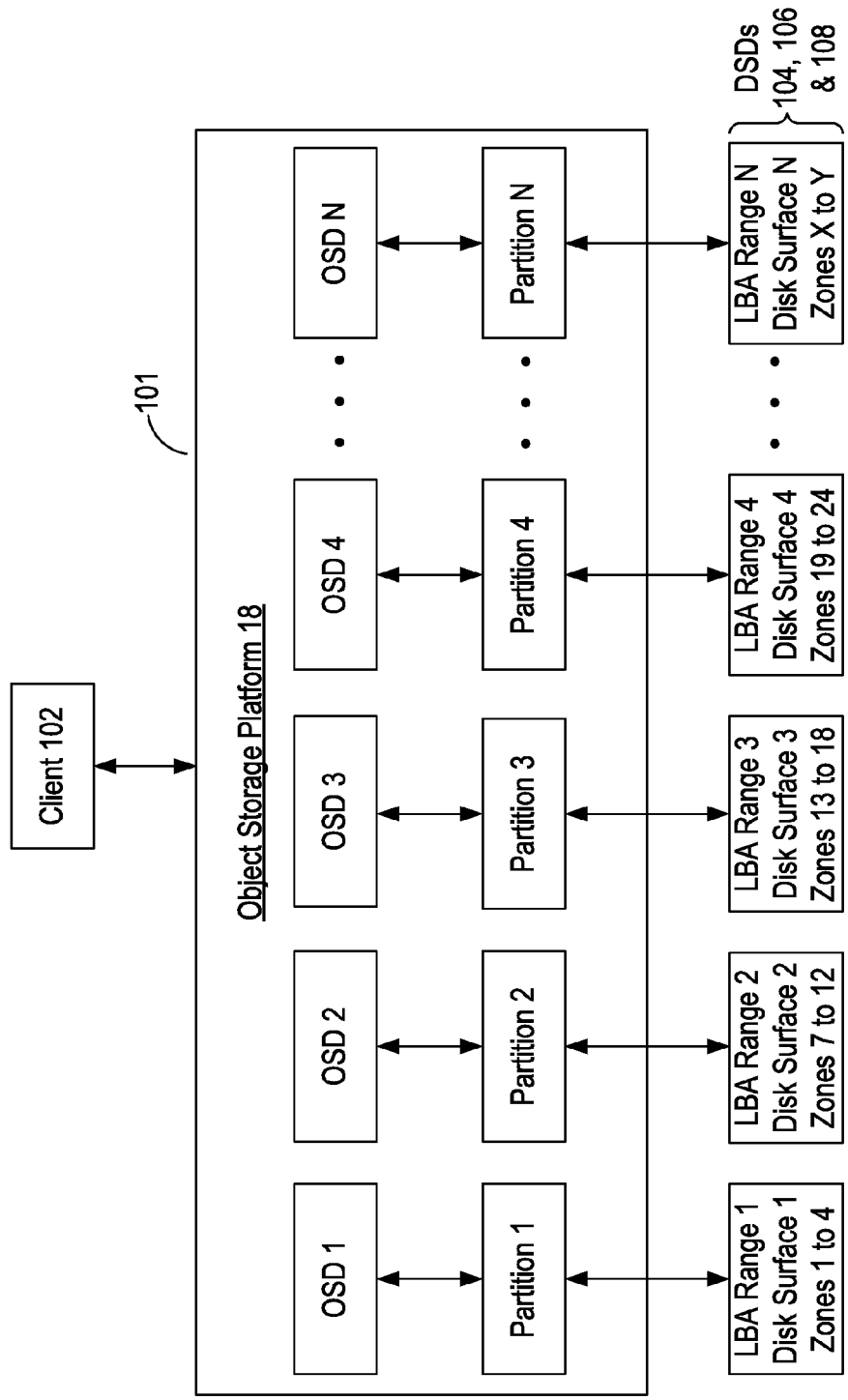
FIG. 5 depicts an example system architecture for a storage system according to an embodiment.

FIG. 5 depicts an example system architecture for storage system 100 according to an embodiment. As shown in FIG. 5, each disk surface or media portion in cluster 112 is associated with a particular LBA range and set of zones. Since each media portion is associated with a contiguous range of LBAs, host 101 can use OS 22, DSD driver 12, and/or file system 20 to partition the addresses assigned to each DSD based on media mapping information 16 so that each partition maps to only one media portion (e.g., disk surface). In this regard, DSD driver 12 may receive media mapping information 16 from each of DSDs 104, 106, and 108 indicating the address ranges for each disk surface or head in cluster 112. Object storage platform 18 can then identify each partition as a separate OSD for storing data received from client 102. In other implementations, DSD driver 12 may use media mapping information 16 received from DSDs 104, 106, and 108 as Logical Unit Number (LUN) information to represent each disk surface as a separate logical device to object storage platform 18.

Example Processes

Figure 6:
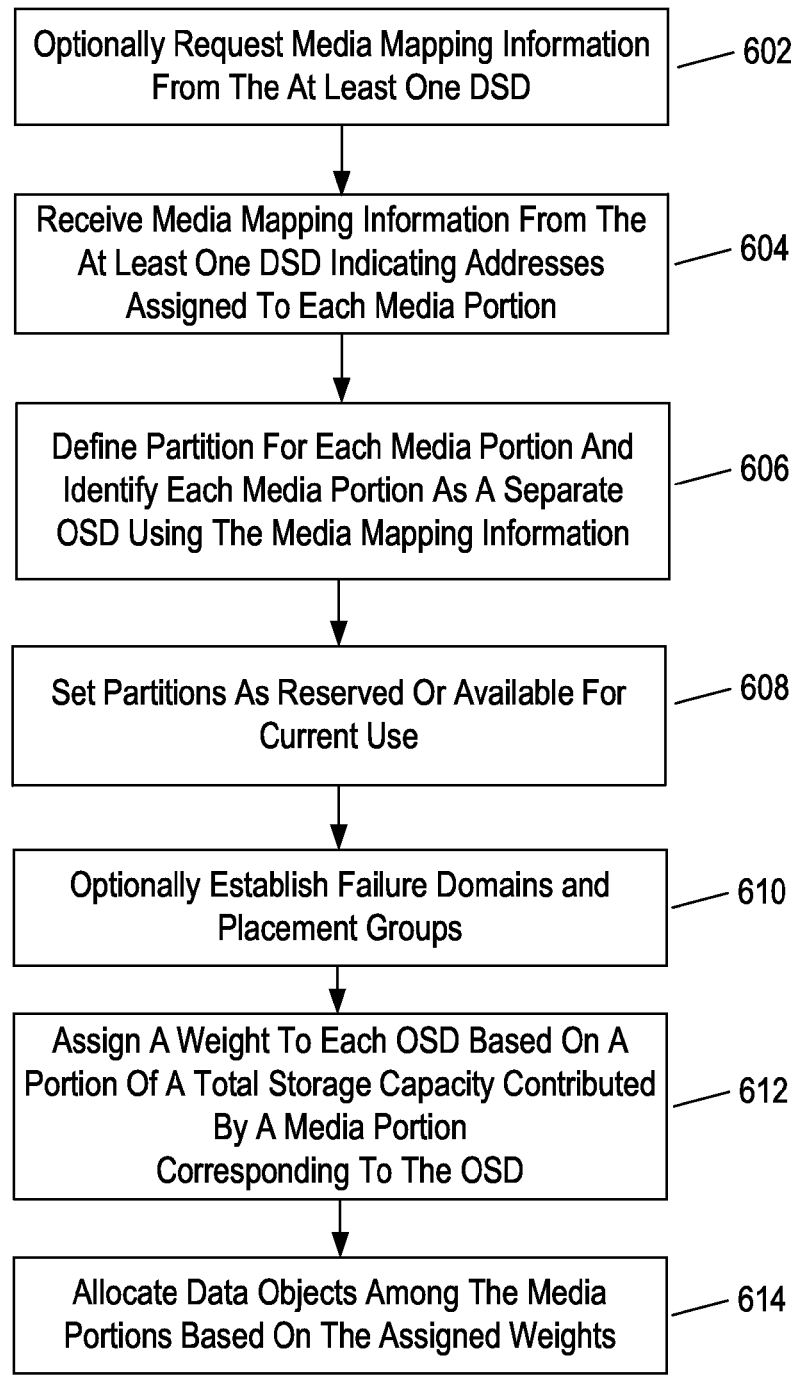
FIG. 6 is a flowchart for a cluster initialization process according to an embodiment.

FIG. 6 is a flowchart for an initialization process that can be performed by CPU 109 of host 101 for defining the OSDs of storage system 100 according to an embodiment. In block 602, CPU 109 may optionally request head mapping information from DSDs in cluster 112. This request can include, for example, a zone ATA command to request address or zone information such as media mapping information 16. In other implementations, each DSD in cluster 112 may instead automatically send media mapping information 16 to host 101. In yet another implementation, host 101 may send a read command to each DSD as part of a startup process of host 101 to retrieve data from a partition table stored on the DSD.

In block 604, host 101 receives media mapping information 16 via data storage interface 119 from DSDs 104, 106, and 108. The received media mapping information 16 indicates addresses assigned to each media portion in cluster 112 and can be stored in memory 110 of host 101 as shown in FIG. 2.

In block 606, CPU 109 defines a partition for each media portion (e.g., disk surface/head or solid-state memory die) and identifies each media portion as a separate OSD using media mapping information 16. As discussed above, OS 22, DSD driver 12, and/or file system 20 can be used to partition the addresses assigned to each DSD based on media mapping information 16 so that each partition maps to only one media portion (e.g., disk surface or die). The partitions are then provided to object storage platform 18, which identifies each partition as a separate OSD.

In block 608, object storage platform 18 sets the partitions or media portions as being reserved or available for current use. In this regard, object storage platform 18 may reserve certain media portions as a spare or overprovisioned area that can serve as a replacement media portion when one of the currently available media portions becomes no longer available for storing data. For example, a disk surface media portion may become no longer available for storing data for reasons such as a failure of a head, if the disk surface becomes inaccessible, or if the disk surface reaches its data storage capacity.

In block 610, object storage platform 18 may optionally establish failure domains corresponding to each media portion so that redundant data (e.g., parity data or copies of data) or erasure coded data that is used to rebuild a failed OSD are not stored in the same media portion as the original data. In one implementation, object storage platform 18 can identify redundant data or erasure coded data associated with a data object stored on or to be stored on a disk surface and determine an OSD for storing the redundant or erasure coded data so that the redundant or erasure coded data is not stored on the same disk surface as its associated data object.

In addition, object storage platform 18 in block 610 may also optionally establish placement groups including sets of OSDs eligible for storing redundant data or erasure coded data. In one example, a failure domain can correspond to a disk surface while a placement group can correspond to a DSD. In such an example, redundant data may be stored in an OSD from a placement group outside of the DSD where the original data is stored so that the redundant data is not stored in the same DSD as the original data. This can further improve the reliability of system 100 in the event an entire DSD fails. In other examples, the placement group may correspond to groups of DSDs in one or more racks of DSDs or DSDs grouped by geographical area (e.g., in different buildings or cities). In such an example, a condition affecting access of an OSD in one placement group (e.g., a condition affecting access in one rack, building, or city) may not affect access to the redundant data stored in another placement group.

Object storage platform 18 may also use an algorithm such as a hashing algorithm (e.g., a Controlled Replication Under Scalable Hashing (CRUSH) algorithm) to determine which OSDs or disk surfaces should store different data objects so that the storage of data objects is generally balanced across the OSDs in object based storage cluster 112. As part of this balancing, object storage platform 18 assigns a weight to each OSD (e.g, disk surface or die) in block 612 based on a portion of a total storage capacity contributed by a media portion corresponding to the OSD. The weight can include, for example, a percentage of the available data storage capacity contributed by a particular media portion to the total storage capacity of cluster 112.

In block 614, the object storage platform 18 allocates data objects among the media portions or OSDs in cluster 112 based on the weights assigned in block 612. As noted above, this can be part of a hashing algorithm used by object storage platform 18 to evenly distribute objects among the DSDs in cluster 112.

Figure 7:
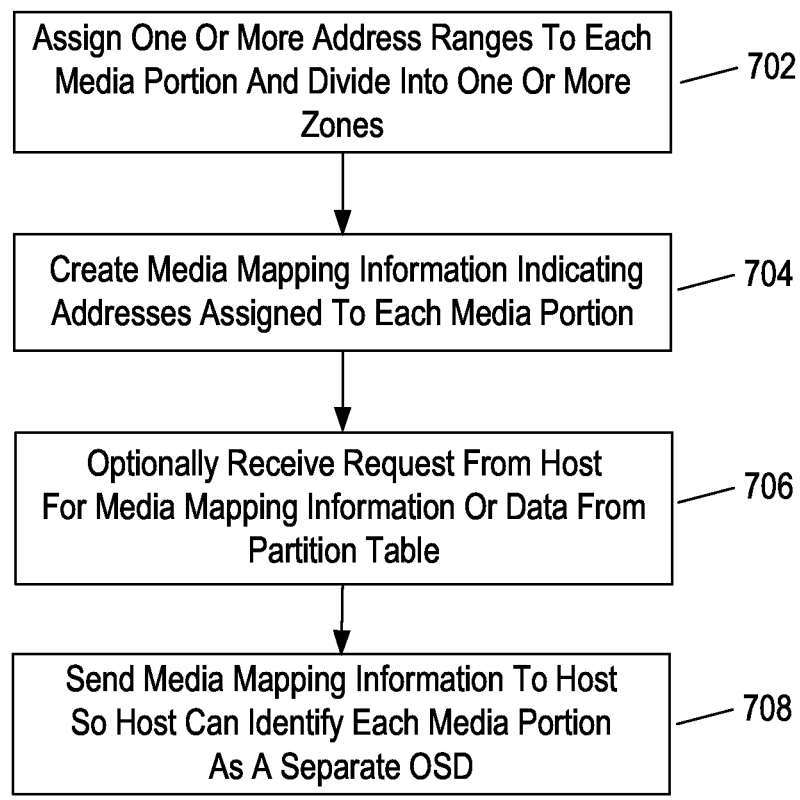
FIG. 7 is a flowchart for a DSD initialization process according to an embodiment.

FIG. 7 is a flowchart for a DSD initialization process that can be performed by controller 120 executing DSD firmware 14 according to an embodiment. In block 702, controller 120 assigns one or more address ranges to each media portion (e.g., disk surfaces 134, 136, 138, and 142 or dies 334 to N). In addition, in an implementation where the media portions include disk surfaces, controller 120 divides the address ranges for each disk surface into one or more zones (e.g., zones 1 to 24 shown in FIG. 4) such that there is an integral number of zones on each disk surface.

In block 704, controller 120 creates media mapping information 16 to indicate the addresses assigned to each media portion. In one implementation, media mapping information 16 can include starting addresses for each disk surface corresponding to the beginning of each zone on the disk surface. In other implementations, media mapping information 16 can include a starting address and an ending address or a length for each zone on the disk surface. Media mapping information 16 can be stored in memory 140 as shown in FIGS. 3A and 3B.

In some implementations, media mapping information 16 can be used to create a replacement partition table that indicates the addresses assigned to each media portion of DSD 106. In conventional systems, a host can obtain partition information during a startup process of the host by reading a partition table usually located at LBA 0 for a Master Boot Record (MBR) or from LBA 1 to LBA n for a Globally Unique Identifier (GUID) Partition Table (GPT). In such a system, DSD firmware 14 may mask the request from the host to read the MBR or GPT by constructing a replacement partition table using DSD firmware 14 rather than reading an MBR or GPT from a disk surface. This can allow for media mapping information 16 to be returned to host 101 in partition table format using the replacement partition table so that no changes are required to software executing on the host.

In block 706, controller 120 optionally receives a request from host 101 via host interface 126 for head mapping information. Such a request can be part of a zone ATA command to request address or zone information. In other implementations, the request can be for data from a partition table.

In block 708, controller 120 sends media mapping information 16 to host 101 via host interface 126 so that host 101 can identify each media portion as a separate OSD. As noted above, media mapping information 16 may include data from a replacement partition table created by controller 120.

Figure 8A:
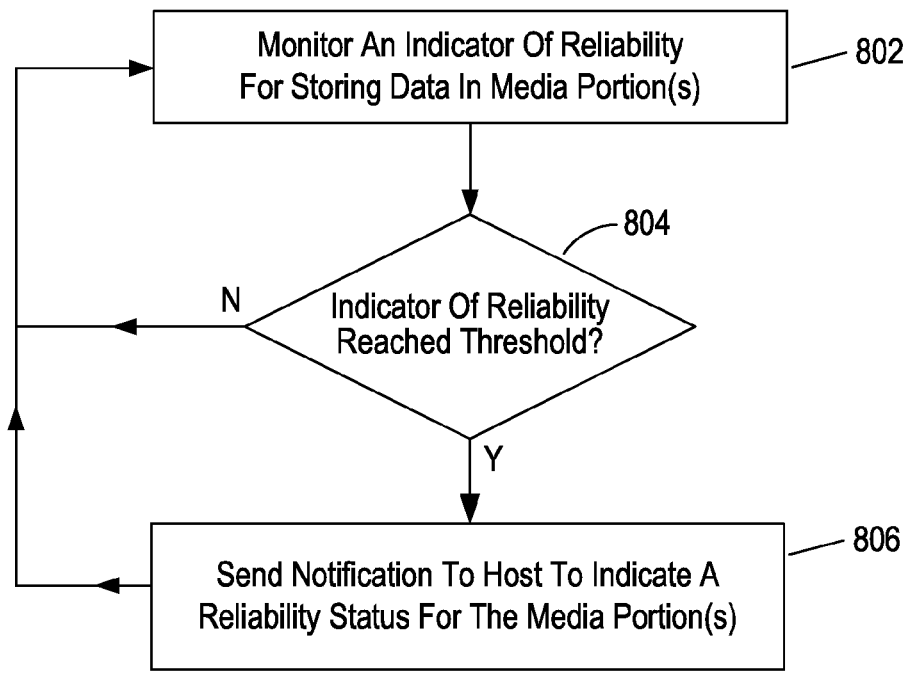
FIG. 8A is a flowchart for a monitoring process performed by a DSD according to an embodiment.

FIG. 8A is a flowchart for a monitoring process that can be performed by controller 120 executing DSD firmware 14 according to an embodiment. In other implementations, the monitoring process of FIG. 8A may be performed by a monitor node such as monitor node 107 in FIG. 1.

In the example process of FIG. 8A, controller 120 monitors an indicator of reliability for storing data in one or more media portions of DSD 106. The indicator of reliability can include, for example, at least one of an error reported in performing a read or write command, a frequency or amount of errors for the media portion, a number of operations performed in the media portion, and an average time for performing operations in the media portion. In the example of a number of operations performed on a disk surface or in a die of a solid-state memory, a number of operations exceeding a threshold number of operations may indicate that the disk surface or the die is becoming less reliable for storing data due to its increased usage. In the example of the average time for performing operations, an increase of the average time over a threshold may be a sign that the disk surface or die is becoming less reliable due to additional read or write retries that may be needed to access data from the media portion. Other implementations may use other criterion for determining the reliability of a media portion for storing data.

In block 804, controller 120 determines whether the indicator of reliability has reached a threshold. If so, a notification is sent to host 101 indicating a reliability status for the media portion. If the indicator of reliability has not reached the threshold, controller 120 continues to monitor the indicator of reliability for storing data in the media portion.

Figure 8B:
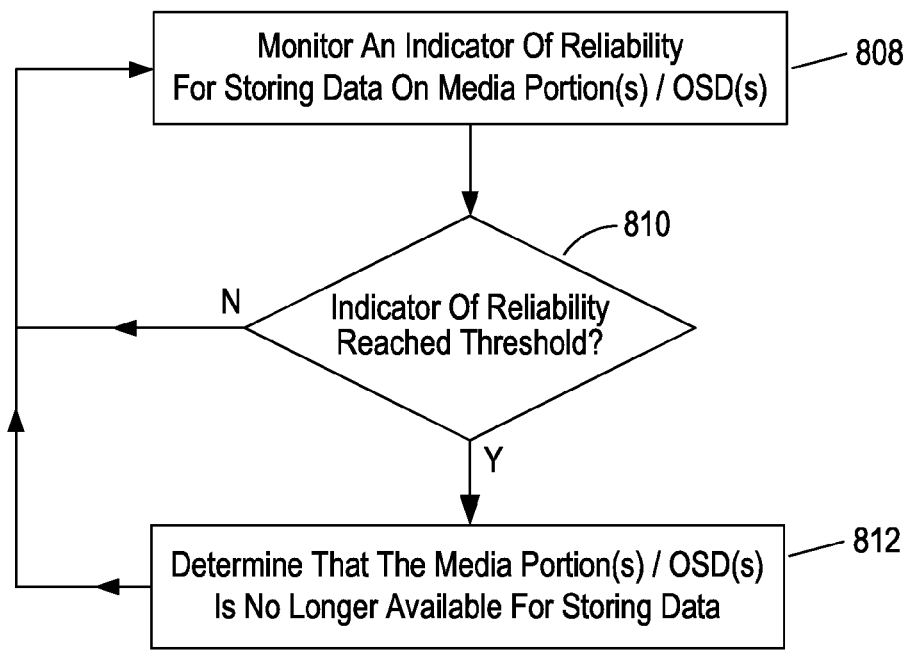
FIG. 8B is a flowchart for a monitoring process performed by a host according to an embodiment.

FIG. 8B provides an example monitoring process similar to the monitoring process of FIG. 8A except that the monitoring is performed by CPU 109 of host 101 instead of by controller 120 of DSD 106. In this regard, the indicator of reliability can be monitored by host 101 in block 808 using DSD driver 12 or another application executing on host 101 that can request and receive reliability indicators from the DSDs in cluster 112. In one implementation, host 101 may use a Self-Monitoring, Analysis, and Reporting Technology (SMART) application to monitor the reliability of media portions.

In block 810, DSD driver 12 determines whether an indicator of reliability has reached a threshold. Reaching the threshold may indicate that the media portion may be getting close to failure. In such a case, DSD driver 12 determines in block 812 that the media portion or OSD is no longer available for storing data.

Figure 9:
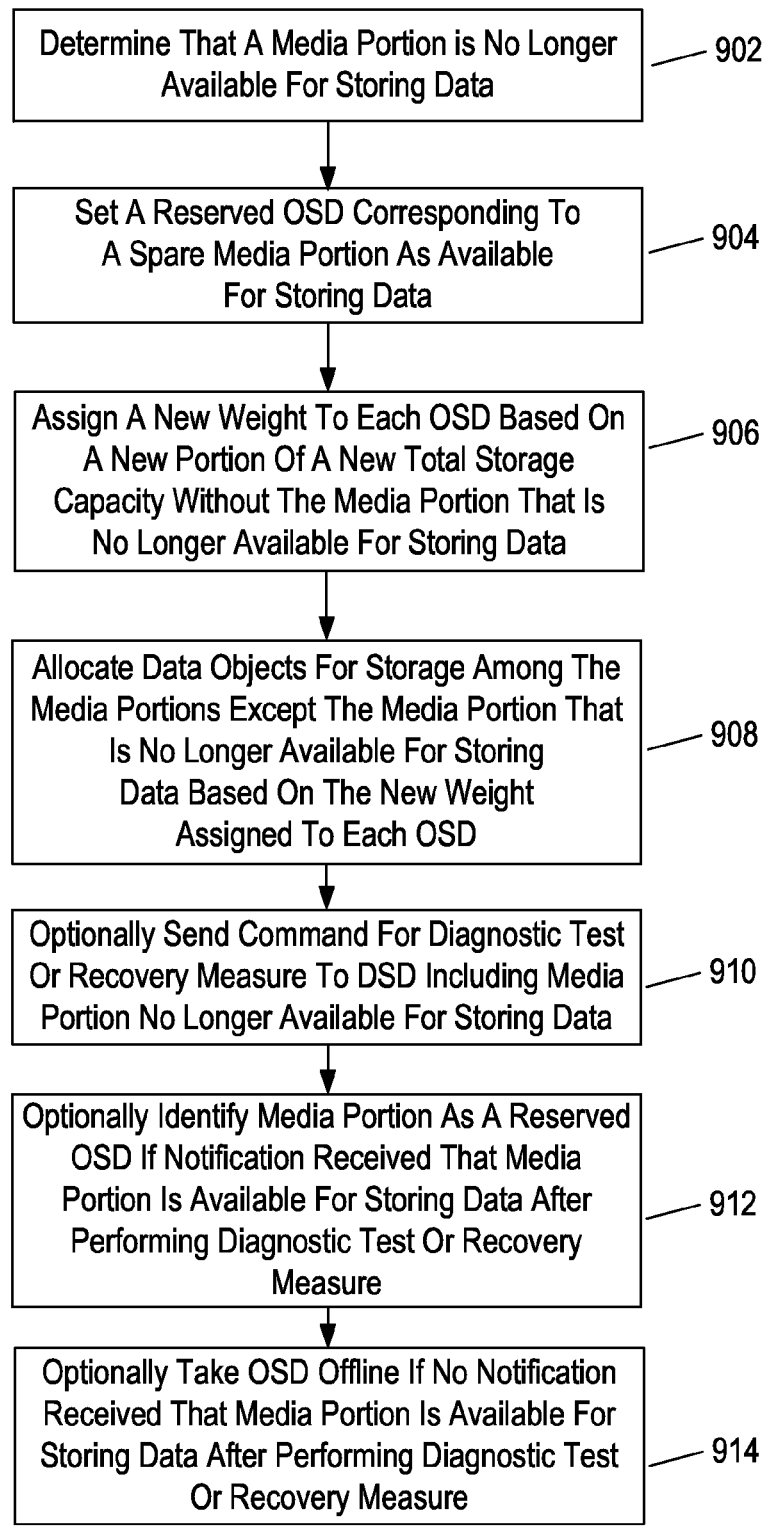
FIG. 9 is a flowchart for an Object Storage Device (OSD) replacement process according to an embodiment.

FIG. 9 is a flowchart for an Object Storage Device (OSD) replacement process that can be performed by CPU 109 of host 101 according to an embodiment. The process of FIG. 9 can be performed in cases where host 101 has received a notification that a media portion may no longer be reliable for storing data as in the process of FIG. 8A or where host 101 has determined that a media portion or OSD is no longer available for storing data as in the process of FIG. 8B or where the media portion has reached its storage capacity. In another implementation, object storage platform 18 may determine that an OSD or media portion is no longer available for storing data based on a certain level of failed commands sent to a particular OSD. In an example using Ceph, a Ceph OSD daemon can be deployed for each OSD so that when a certain level of commands to an OSD fail, the Ceph daemon fails and object storage platform 18 determines that the OSD is no longer available for storing data.

In block 902, CPU 109 determines that a disk surface is no longer available for storing data. As noted above, this may be determined based on information pertaining to the reliability of the media portion that is obtained by object storage platform 18, DSD driver 12 or another application executing on host 101.

In block 904, object storage platform 18 sets a reserved OSD corresponding to a spare media portion (e.g., a spare disk surface or a spare die) as available for storing data. The spare media portion may be located within the same DSD as the unavailable media portion or the spare media portion may be located in a DSD that has been reserved for providing spare media portions. For example, with reference to the example of FIG. 3A, disk surface 142 may remain unused as a reserved OSD until it replaces another disk surface in DSD 106 or another disk surface in cluster 112. In another example, DSD 108 may remain unused with disk surfaces that are reserved as OSDs until they replace other disk surfaces in cluster 112.

In block 906, object storage platform 18 assigns a new weight to each OSD based on a new portion of a new total storage capacity without the media portion that is no longer available for storing data. Depending on the storage capacity of the replacement media portion, the new weights for each OSD could increase or decrease from the previous weights assigned to each OSD. If the replacement media portion has a greater storage capacity than the replaced media portion, the new weights will be less than the old weights. On the other hand, if the replacement media portion has a lower storage capacity than the replaced media portion, the new weights will be greater than the old weights. The new weights can be used to rebalance the storage of data objects among the disk surfaces in cluster 112 so that the data objects are more evenly distributed among the media portion.

In block 908, the data objects are allocated for storage among the media portions in cluster 112 based on the new weight assigned to each OSD. This can be part of a rebalancing operation performed by object storage platform 18 where data objects are migrated from one OSD to another to maintain a certain level of capacity at each OSD or media portion. In addition, rebalancing may occur when a new DSD is added to cluster 112 to lower the weights assigned to each OSD based on the availability of new media portions for storing data.

In block 910, CPU 109 optionally sends a command for a diagnostic test or recovery measure to the DSD that includes the media portion no longer available for storing data. A recovery measure can include, for example, creating a new defect map for a disk surface so that the disk surface can continue to be used. A diagnostic test can include, for example, a test write command to see if data can now be successfully stored in the media portion. Such a diagnostic test can be helpful in cases where the unavailability of the media portion was due to a temporary condition such as a temporary environmental condition like vibration of a DSD.

In block 912, CPU 109 optionally identifies the media portion that is no longer available as a reserved OSD if a notification is received that the media portion is available for storing data after performing the diagnostic test or recovery measure. On the other hand, if no notification is received that the media portion is available for storing data, object storage platform 18 can take the OSD offline to remove the OSD from cluster 112. The media portion corresponding to the offline OSD is then no longer used for storing data objects and is also not reserved as a spare media portion.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A host, comprising:
    an interface for communicating with at least one Data Storage Device (DSD) including a plurality of media portions for storing data, wherein each media portion of the plurality of media portions is a disk surface of a rotating magnetic disk or a die of a solid-state memory; and
    a processor configured to:
        receive media mapping information from the at least one DSD via the interface, the media mapping information indicating one or more ranges of multiple addresses assigned to each media portion of the plurality of media portions;
        use at least one of an Operating System (OS), a file system, and a driver to partition the one or more ranges of multiple addresses to define a partition or a logical device for each media portion of the plurality of media portions based on the received media mapping information; and
        identify, using the defined partition or logical device, each media portion of the plurality of media portions as a separate Object Storage Device (OSD) in an object based storage cluster such that each disk surface or die of the plurality of media portions is identified as a separate OSD.

2. The host of claim 1, wherein the media mapping information indicates a plurality of contiguous ranges of multiple addresses assigned to a media portion of the plurality of media portions.

3. The host of claim 1, wherein the processor is further configured to:
    assign a weight to each OSD based on a portion of a total storage capacity of the plurality of media portions that is contributed by a media portion corresponding to the OSD; and
    allocate data objects for storage among the plurality of media portions based on the weight assigned to each OSD.

4. The host of claim 3, wherein the processor is further configured to:
    determine that a media portion of the plurality of media portions is no longer available for storing data;
    assign a new weight to each OSD based on a new portion of a new total storage capacity of the plurality of media portions without the media portion that is no longer available for storing data; and
    allocate data objects for storage among the plurality of media portions except the media portion that is no longer available for storing data, wherein the allocation of data objects is based on the new weight assigned to each OSD.

5. The host of claim 1, wherein the processor is further configured to:
    determine that a media portion of the plurality of media portions is no longer available for storing data; and
    set a reserved OSD corresponding to a spare media portion as available for storing data.

6. The host of claim 5, wherein the spare media portion is located within the same DSD as the media portion that is no longer available for storing data.

7. The host of claim 5, wherein the spare media portion is located within a spare DSD of the at least one DSD that has been reserved for providing spare media portions.

8. The host of claim 1, wherein the processor is further configured to:
    monitor an indicator of reliability for storing data on a media portion of the plurality of media portions; and
    compare the indicator of reliability to a threshold to determine whether the media portion is no longer available for storing data.

9. The host of claim 1, wherein the processor is further configured to:
    determine whether a media portion of the plurality of media portions is available for storing data; and
    if it is determined that the media portion is no longer available for storing data:
        send a command to a DSD of the at least one DSD that includes the media portion, wherein the command instructs the DSD to perform a diagnostic test or a recovery measure for the media portion; and
        identify the media portion as a reserved OSD if a notification is received from the DSD that the media portion is available for storing data after performing the diagnostic test or the recovery measure.

10. The host of claim 1, wherein the processor is further configured to:
    identify redundant data or erasure coded data associated with a data object stored in or to be stored in a media portion of the plurality of media portions; and
    determine an OSD for storing the redundant data or erasure coded data so that the redundant data or erasure coded data is not stored in the same media portion as its associated data object.

11. The host of claim 10, wherein in determining the OSD for storing the redundant or erasure coded data, the processor is further configured to identify from among a plurality of predetermined sets of OSDs, a predetermined set of OSDs including the OSD for storing the redundant data or erasure coded data.

12. The host of claim 1, wherein the processor is further configured to send via the interface a command to the at least one DSD to request the media mapping information.

13. A Data Storage Device (DSD), comprising:
    an interface configured to communicate with a host;
    a plurality of media portions for storing data, wherein each media portion of the plurality of media portions is a disk surface of a rotating magnetic disk or a die of a solid-state memory; and
    a controller configured to:
        assign one or more ranges of multiple addresses to each media portion of the plurality of media portions;
        create media mapping information indicating the one or more ranges of multiple addresses assigned to each media portion of the plurality of media portions; and
        send the media mapping information to the host via the interface so that the host can use at least one of an Operating System (OS), a file system, and a driver to partition the one or more ranges of multiple addresses to define a partition or a logical device for each media portion of the plurality of media portions based on the media mapping information and identify each media portion of the plurality of media portions as a separate Object Storage Device (OSD) in an object based storage cluster such that each disk surface or die of the plurality of media portions is identified as a separate OSD.

14. The DSD of claim 13, wherein the controller is further configured to:
create a replacement partition table indicating the one or more ranges of multiple addresses assigned to each media portion of the plurality of media portions;
receive a request from the host via the interface requesting data from a partition table stored in a media portion; and
in response to the request from the host, send data from the replacement partition table as the media mapping information.

15. The DSD of claim 13, wherein the controller is further configured to:
monitor an indicator of reliability for storing data in a media portion of the plurality of media portions;
determine whether the indicator of reliability has reached a threshold; and
if the indicator of reliability has reached the threshold, send a notification via the interface to the host to indicate a reliability status for the media portion.

16. The DSD of claim 15, wherein the indicator of reliability indicates at least one of a frequency or an amount of errors for the media portion, a number of operations performed in the media portion, and an average time for performing operations in the media portion.

17. The DSD of claim 13, wherein the plurality of media portions include at least one spare media portion reserved as a replacement media portion.

18. The DSD of claim 13, wherein the controller is further configured to send the media mapping information to the host in response to a command received from the host via the interface.

19. A method for operating an object based storage cluster including at least one Data Storage Device (DSD) with a plurality of media portions for storing data, wherein each media portion of the plurality of media portions is a disk surface of a rotating magnetic disk or a die of a solid-state memory, the method comprising:
receiving media mapping information from the at least one DSD, the media mapping information indicating ranges of multiple addresses assigned to each media portion of the plurality of media portions;
using at least one of an Operating System (OS), a file system, and a driver to partition the one or more ranges of multiple addresses to define a partition or a logical device for each media portion of the plurality of media portions based on the received media mapping information; and
identifying, using the defined partition or logical device, each media portion of the plurality of media portions as a separate Object Storage Device (OSD) in the object based storage cluster such that each disk surface or die of the plurality of media portions is identified as a separate OSD.

20. The method of claim 19, wherein the media mapping information indicates a plurality of contiguous ranges of multiple addresses assigned to a media portion of the plurality of media portions.

21. The method of claim 19, further comprising:
assigning a weight to each OSD based on a portion of a total storage capacity of the plurality of media portions that is contributed by a media portion corresponding to the OSD; and
allocating data objects for storage among the plurality of media portions based on the weight assigned to each OSD.

22. The method of claim 21, further comprising:
determining that a media portion of the plurality of media portions is no longer available for storing data;
assigning a new weight to each OSD based on a new portion of a new total storage capacity of the plurality of media portions without the media portion that is no longer available for storing data; and
allocating data objects for storage among the plurality of media portions except the media portion that is no longer available for storing data, wherein the allocation of data objects is based on the new weight assigned to each OSD.

23. The method of claim 19, further comprising:
determining that a media portion of the plurality of media portions is no longer available for storing data; and
setting a reserved OSD corresponding to a spare media portion as available for storing data.

24. The method of claim 23, wherein the spare media portion is located within the same DSD as the media portion that is no longer available for storing data.

25. The method of claim 23, wherein the spare media portion is located within a spare DSD of the at least one DSD that has been reserved for providing spare media portions.

26. The method of claim 19, further comprising:
monitoring an indicator of reliability for storing data on a media portion of the plurality of media portions; and
comparing the indicator of reliability to a threshold to determine whether the media portion is no longer available for storing data.

27. The method of claim 19, further comprising:
determining whether a media portion of the plurality of media portions is available for storing data; and
if it is determined that the media portion is no longer available for storing data:
sending a command to a DSD of the at least one DSD that includes the media portion, wherein the command instructs the DSD to perform a diagnostic test or a recovery measure for the media portion; and
identifying the media portion as a reserved OSD if a notification is received from the DSD that the media portion is available for storing data after performing the diagnostic test or the recovery measure.

28. The method of claim 19, further comprising:
identifying redundant data or erasure coded data associated with a data object stored on or to be stored in a media portion of the plurality of media portions; and
determining an OSD for storing the redundant data or erasure coded data so that the redundant data or erasure coded data is not stored in the same media portion as its associated data object.

29. The method of claim 28, wherein in determining the OSD for storing the redundant or erasure coded data, the method further comprises identifying from among a plurality of predetermined sets of OSDs, a predetermined set of OSDs including the OSD for storing the redundant data or erasure coded data.

30. The method of claim 19, further comprising sending a command to the at least one DSD to request the media mapping information.

31. A method for operating a Data Storage Device (DSD) including a plurality of media portions for storing data, wherein each media portion of the plurality of media portions is a disk surface of a rotating magnetic disk or a die of a solid-state memory, the method comprising:

assigning one or more ranges of multiple addresses to each media portion of the plurality of media portions;

creating media mapping information indicating the one or more ranges of multiple addresses assigned to each media portion of the plurality of media portions; and sending the media mapping information to a host so that the host can use at least one of an Operating System (OS), a file system, and a driver to partition the one or more ranges of multiple addresses to define a partition or a logical device for each media portion of the plurality of media portions based on the media mapping information and identify each media portion of the plurality of media portions as a separate Object Storage Device (OSD) in an object based storage cluster such that each disk surface or die of the plurality of media portions is identified as a separate OSD.

32. The method of claim 31, further comprising:

creating a replacement partition table indicating the one or more ranges of multiple addresses assigned to each media portion of the plurality of media portions;

receiving a request from the host via requesting data from a partition table stored in a media portion; and in response to the request from the host, sending data from the replacement partition table as the media mapping information.

33. The method of claim 31, further comprising:

monitoring an indicator of reliability for storing data on a media portion of the plurality of media portions;

determining whether the indicator of reliability has reached a threshold; and if the indicator of reliability has reached the threshold, sending a notification to the host to indicate a reliability status for the media portion.

34. The method of claim 33, wherein the indicator of reliability indicates at least one of a frequency or an amount of errors for the media portion, a number of operations performed in the media portion, and an average time for performing operations in the media portion.

35. The method of claim 31, wherein the plurality of media portions include at least one spare media portion reserved as a replacement media portion.

36. The method of claim 31, further comprising sending the media mapping information to the host in response to a command received from the host.

* * * * *